Reissued Oct. 3, 1939

Re. 21,224

UNITED STATES PATENT OFFICE 21,224

COHERENT ZIRCONIUM SILICATES

Charles J. Kinzie, Niagara Falls, N. Y., assignor to The Titanium Alloy Manufacturing Company, New York, N. Y., a corporation of Maine No Drawing. Original No. 2,101,947, dated December 14, 1937, Serial No. 682,795, July 29, 1933. Application for reissue June 2, 1939, Serial No. 277,118

11 Claims. (Cl. 106—9)

My invention relates generally to the production of coherent zirconium silicate masses. Such masses may be employed for filtration purposes, gas dispersions and the like, as well as for abrasive tools and refractories.

Zirconium silicate, present in nature as the mineral zircon, is a material that inherently possesses a high degree of stability and resistance to contact with chemicals, and that also admirably withstands high temperatures. When fired at high temperatures, it yields products which are highly refractory in nature. In the past, however, certain difficulties have been experienced in securing proper cohesion of such masses. This is particularly true where the masses are porous, that is, where the particles of zirconium silicate are separated by pores or air spaces.

It is therefore an object of this invention to produce coherent masses of zirconium silicate. Other objects will appear hereinafter.

These objects are accomplished by mixing with zirconium silicate a bonding agent comprising a double silicate of zirconium and a metal taken from the group consisting of alkali metals, alkaline earth metals and magnesium, or a material which will form such a double silicate at an elevated temperature, and firing said mixture at an elevated temperature.

The double silicates of the above class which may be used are sodium zirconium silicate, potassium zirconium silicate, barium zirconium silicate, calcium zirconium silicate and magnesium zirconium silicate. A material which will decompose to form sodium zirconium silicate at an elevated temperature is a solution of sodium zirconium silicon citrate.

The amount of bonding agent used is that necessary to produce the required effect. In the case of sodium zirconium silicon citrate solution it may, for example, vary from 1 to 12 parts by weight of the solution to 100 parts of granular zirconium silicate or zircon.

In order to further improve the bonding of zirconium silicate when such double silicates are used, acid substances may be included. These may be added to the mixture, in the form of liquids, prior to shaping, or the mixture after shaping may be subjected to acid fumes. Examples of liquid acids are $H_2SO_4$, $HNO_3$ or phosphoric acid. Examples of acid fumes are HCl, $SO_2$ or fumes from $H_2SO_4$ (i. e. $SO_3$). Solutions of such acid fumes may also be employed (e. g. HCl).

In addition to the zircon or zirconium silicate, other materials may be included in the compositions of the present invention. For example, granular materials such as silica sand, natural or synthetic corundum, or silicon carbide may be admixed therewith.

After the mixture is formed, it is fired at an elevated temperature, such as between 800° C. and 1500° C.

Having described the invention, the following examples are now given. Unless otherwise mentioned, parts are parts by weight.

*Example 1*

A sodium zirconium silicon citrate solution is prepared as follows: Finely-milled zirconium silicate is decomposed by heating with an alkali such as sodium carbonate at a temperature of 900°–950° C. to yield a product readily soluble in dilute acids. Other alkalis, such as sodium hydrate, sodium peroxide or sodium sulfide, or mixtures thereof, may be used in place of sodium carbonate; or potassium compounds such as potassium carbonate may be used. 100 parts of this roasted product, consisting of sodium zirconium silicate, are wet milled with 96 parts of water in a suitable ball mill until less than 0.5% remains on a 325 mesh sieve when a sample is tested for fineness. The mill is discharged, and the slurry thus obtained, which consists mainly of sodium zirconium silicate in water suspension, will have a composition approximately as follows:

| | Per cent |
|---|---|
| Zirconium (calculated as $ZrO_2$) | 20.65 |
| Silicon (calculated as $SiO_2$) | 10.49 |
| Sodium (calculated as $Na_2O$) | 14.06 |
| Water, etc | 54.80 |

59.1 parts of citric acid are then dissolved in 63.5 parts of water at about 80°–90° C., and 100 parts of the above sodium zirconium silicate slurry are added by suitable dispensing equipment while stirring the citric acid solution. The sodium zirconium silicate dissolves almost completely leaving a small amount of insoluble residue which if recovered will constitute less than two parts of the 100 parts of sodium zirconium silicate slurry used. This represents a conversion of approximately 94% of the zircon originally used into dissolved condition. Whether this small amount of insoluble matter is removed from the citrate solution is of no importance; if retained the dried product would be more or less opaque.

The solution formed has a slight acid reaction and in contact with iron has a mild reactive effect with the iron. I have found that if the solution is neutralized by any suitable alkaline substance—ammonium hydrate for example,—and preferably made slightly alkaline, it then does not affect iron and may be handled without detriment in iron vessels. The neutralizing may be effected either before or after removing the insoluble residue.

After settling out the small amount of insoluble residue, the essentially clear neutral or slightly alkaline solution is then decanted and upon analysis has approximately the following composition:

| | Per cent |
|---|---|
| Silicon (calculated as $SiO_2$) | 4.07 |
| Zirconium (calculated as $ZrO_2$) (including small amounts of aluminum and rare earths) | 7.96 |
| Titanium (calculated as $TiO_2$) | 0.02 |
| Iron (calculated as $Fe_2O_3$) | 0.01 |
| Carbon (C) | 8.21 |
| Sodium (calculated as $Na_2O$) | 5.95 |
| Water | 73.78 |

The solution has an index of refraction of 1.490–1.495 and a specific gravity of 1.325.

7 parts by weight of the above solution are mixed with 100 parts by weight of granular zircon ($ZrSiO_4$),—60+200 mesh in size. The mixture is formed into suitable shape by pressing into a suitable form and then dried. The shaped mass is then burned to about 1200° C. to form the finished article which is a porous material consisting of $ZrSiO_4$ grains bonded together by the residual products of the sodium zirconium silicon citrate mainly sodium zirconium silicate.

The citrate solution referred to I have found to be an excellent bonding agent, effectively bonding throughout the temperature range from room temperature to the maturing point of the objects formed.

*Example 2*

The same procedure is followed as in Example 1 except that the sodium zirconium silicate slurry, before being added to the citric acid solution, is freed from water-soluble material as follows: The water dissolved material consists mainly of any excess alkali as well as small amounts of sodium aluminate, and sodium silicate, traces of chromium, vanadium, manganese, etc. which may be removed simply by separating the sodium zirconium silicate solids from the small amount of dissolved material by any suitable mechanical means. The water insoluble sodium zirconium silicate is then brought back to the form of slurry by dilution with water, and the solution in citric acid effected in the same manner as in the preferred direct treatment procedure, but reducing the amount of citric acid in proportion to the amount of material removed.

This purification step may prove important in case cruder ores are used or in case of ores or materials in which there is an excess of silicon mineral.

*Example 3*

100 parts of granular zircon ($ZrSiO_4$)—60+200 mesh in size are compounded with 2 parts of sodium zirconium silicate having the following analysis:

| | Percent |
|---|---|
| Silicon (calculated as $SiO_2$) | 20.58 |
| Zirconium (calculated as $ZrO_2$) | 40.48 |
| Sodium (calculated as $Na_2O$) | 27.57 |
| Balance, moisture, etc. | 11.37 |

Sufficient water is then added to make a stiff mixture which is then mixed and shaped into the form of the desired finished article. A small amount of an acid substance, such as HCl, may be added with the water to assist in setting the mixture. The formed object is then burned at a temperature of about 1200° C. to form a porous article.

*Example 4*

A porcelain-like zircon body may be produced by mixing milled zircon (for example—325 mesh zircon) with the bonding agent as in Example 1, 2 or 3 and then burning the mix to a temperature high enough to form a porcelain-like zircon material which in itself is non-porous or practically so.

*Example 5*

An object of very large pores may be produced by crushing the material produced in accordance with Example 4, mixing with the bonding agent as in Example 1, 2 or 3, and firing at an elevated temperature as before.

*Example 6*

The same procedure is followed as in Example 1 except that zirkite is used as a raw material in place of zircon. Free silica is added until the ratio of $ZrO_2$ to $SiO_2$ is approximately 65 to 35.

Porous masses formed of zirconium silicate in accordance with the present invention have a number of different uses. Some of these uses may be enumerated as follows: (1) As filter plates in filtrations of various kinds; (2) As diaphragms in electrolysis; (3) As instruments to disperse gases as these are led into liquids such as in the case of absorbing gases in liquids, the function being, by means of suitable connections to the porous zircon object in the liquid, to force the gas through the multitude of pores and into the liquid in a multitude of fine bubbles which are more readily absorbed than are the larger bubbles; (4) As separating plates for purpose of separating two liquids which are purposely brought together slowly; (5) As refractory objects in combustion equipment having the effect of intimately contacting the combustible gas with the gaseous oxidizing agent; (6) As an abrasive material; (7) As a super-refractory material for objects required to stand high temperatures.

In the appended claims such substances used as the bonding agents which I have described comprise double silicates of zirconium and certain other metals, or materials that under the temperatures applied will decompose to form such double silicates.

I claim:

1. A coherent fired zirconium silicate comprising zirconium silicate interstitially bonded with a minor quantity of a double silicate of zirconium and a metal taken from the group consisting of alkali metals, alkaline earth metals and magnesium.

2. A coherent fired zirconium silicate comprising zirconium silicate interstitially bonded with a minor quantity of sodium zirconium silicate.

3. A coherent fired zirconium silicate comprising zirconium silicate interstitially bonded with a minor quantity of a double silicate of zirconium and a metal taken from the group consisting of alkali metals, alkaline earth metals and magnesium, together with the reaction product of an acid chosen from the group $H_3PO_4$, HCl, $H_2SO_4$, and $HNO_3$ therewith.

4. A coherent fired porous zirconium silicate comprising granular zirconium silicate interstitially bonded with the coalesced residue of a sodium zirconium silicon citrate solution consisting mainly of sodium zirconium silicate.

5. The method of making coherent zirconium silicate which comprises mixing a major quantity of zirconium silicate with a minor quantity of a material taken from the class consisting of double silicates of zirconium and a metal taken from the group consisting of alkali metals, alkaline earth metals and magnesium, and substances capable of forming said double silicates at an elevated temperature, and burning said mixture at an elevated temperature.

6. The method of making coherent zirconium silicate which comprises mixing a major quantity of zirconium silicate with a minor quantity of a double silicate of zirconium and a metal taken from the group consisting of alkali metals, alkaline earth metals and magnesium, adding to said mixture an acid substance chosen from the group $H_3PO_4$, HCl, $H_2SO_4$, and $HNO_3$ with sufficient water to form a stiff mixture, shaping to form, and burning the form at an elevated temperature.

7. The method of making coherent zirconium silicate which comprises mixing a major quantity of zirconium silicate with a minor quantity of a double silicate of zirconium and a metal taken from the group consisting of alkali metals, alkaline earth metals and magnesium, adding to said mixture an acid substance chosen from the group $H_3PO_4$, HCl, $H_2SO_4$, and $HNO_3$ with sufficient water to form a stiff mixture.

8. The method of making coherent porous zirconium silicates which comprises mixing granular zirconium silicate with powdered sodium zirconium silicate in the ratio of about 100 parts of the granular zirconium silicate to 2 parts by weight of the sodium zirconium silicate, adding to the charge an acid substance chosen from the group $H_3PO_4$, HCl, $H_2SO_4$, and $HNO_3$ with sufficient water to form a stiff mixture and shaping same to form, and burning the form at about 1200° C.

9. The method of making coherent zirconium silicate which comprises mixing a major quantity of zirconium silicate with a minor quantity of an aqueous solution of a substance capable of forming at an elevated temperature a double silicate of zirconium and a metal taken from the group consisting of alkali metals, alkaline earth metals and magnesium, shaping to form, and burning the form at an elevated temperature.

10. The method of making coherent porous zirconium silicates which comprises mixing granular zirconium silicate with a sodium zirconium silicon citrate solution, shaping the mixture to form and drying same, and then burning the dried form at temperatures between 800° and 1500° C.

11. The method of making coherent porous zirconium silicates which comprises maxing granular zirconium silicate with a sodium zirconium silicon citrate solution in the ratio of about 100 parts of the granular zirconium silicate to form 1 to 12 parts by weight of said citrate solution, shaping the mixture to form and drying same, and then burning the dried form at temperatures between 800° and 1500° C.

CHARLES J. KINZIE.